(12) United States Patent  
Powell et al.

(10) Patent No.: US 7,539,386 B1
(45) Date of Patent: May 26, 2009

(54) HINGED FIBER OPTIC ROUTING GUIDE

(75) Inventors: Bruce Powell, Cary, NC (US); Anthony P. Noto, Knightdale, NC (US); Richard Kilpatrick, Raleigh, NC (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 11/555,736

(22) Filed: Nov. 2, 2006

Related U.S. Application Data

(60) Provisional application No. 60/744,209, filed on Apr. 4, 2006.

(51) Int. Cl.
*G02B 6/00* (2006.01)

(52) U.S. Cl. .................... 385/135; 385/136; 385/137

(58) Field of Classification Search ................ 385/134, 385/135–137
See application file for complete search history.

(56) References Cited

U.S. PATENT DOCUMENTS

2004/0175090 A1\* 9/2004 Vastmans et al. ............ 385/135

\* cited by examiner

*Primary Examiner*—Frank G Font
*Assistant Examiner*—Michael P Mooney

(57) ABSTRACT

A hinged fiber optic routing guide comprises a base having a front surface and a top edge, a hinge connected to the base top edge, a retaining wall connected to the base front surface, the retaining wall having a pre-determined bend radius, the retaining wall having an inside face, and a retaining tine connected to the retaining wall inside face.

20 Claims, 3 Drawing Sheets

US 7,539,386 B1

HINGED FIBER OPTIC ROUTING GUIDE

CROSS REFERENCE TO RELATED APPLICATIONS

The present patent application is related to and claims the benefit of provisional patent application No. 60/744,209, filed on Apr. 4, 2006, entitled FIBER CABLE RETENTION AND HINGED FIBER OPTIC CABLE ROUTING GUIDE, the entire contents of which are enclosed by reference herein, each of which is assigned to the assignee of the present invention.

BACKGROUND OF THE INVENTION

The present invention is generally related to a fiber optic routing and, more specifically to a hinged fiber optic routing guide for controlling bend radius.

Fiber optic cables need to be routed with a controlled bend radius to insure proper operation and prevent damage. Issues can arise when access is needed and the cables need to be moved. In order to insure proper operation and prevent damage the bend radius needs to be controlled, sometimes through several turns. Also, the fiber optic cables need to be easily mountable and demountable as service changes and when circuit boards are replaced.

Currently, there are no known existing solutions that meet the necessary requirement of controlling bend radius and also allowing easy access to the fiber cables.

Additionally, fiber optic cables come in predominantly three diameters, 1.6 mm, 2 mm, and 3 mm. Fiber optic cables need to be dressed and gently retained as they exit from printed board assembly front panels in order to provide for correct operation and prevent damage.

Currently, there are no known solutions to accommodate multiple sizes of the most common fiber optic cable.

Therefore, what is needed is a fiber optic guide. More specifically, what is needed is a fiber optic guide that controls bend radius control over several turns, easy access to fibers, and access behind the fiber path by hinging the part up while maintaining the bend radius and a retention strip that can hold the most common sizes of fiber optic cable.

SUMMARY OF THE INVENTION

Fiber optic cables need to be routed with a controlled bend radius to insure proper operation and prevent damage. Issues can arise when access is needed and the cables need to be moved. In order to insure proper operation and prevent damage the bend radius needs to be controlled, sometimes through several turns. Also, the fiber optic cables need to be easily mountable and demountable as service changes and when circuit boards are replaced.

The present invention allows for fiber bend radius control over several turns, easy access to fibers, and access behind the fiber path by hinging the part up while maintaining the bend radius. The present invention allows for fiber bend radius control through several turns, easy access to fibers and access to equipment behind the fiber path by hinging the part up while maintaining the bend radius.

Additionally, fiber optic cables come in predominantly three diameters, 1.6 mm, 2 mm, and 3 mm. Fiber optic cables need to be dressed and gently retained as they exit from printed board assembly front panels in order to provide for correct operation and prevent damage.

The only known solution does not accommodate multiple sizes of the most common fiber optic cable. The only known solutions were for an expandable clip for 3 mm diameter only, a 2 mm/2.2 mm blind-hole clip and a snap-in 3 mm diameter only bracket. The available solutions did not support multiple cable diameters with same device.

The present invention employs a special shape to be able to handle multiple diameters while maintaining flex for proper safe cable use. Accommodating the most commonly used fiber cable sizes allows the customer to use one item to run common diameter fiber optic cable. This makes for a clean design allowing optimal routing, space savings and flexibility.

In one embodiment of the present invention a hinged fiber optic routing guide, comprises, a base having a front surface and a top edge, a hinge connected to the base top edge, a retaining wall connected to the base front surface, the retaining wall having a pre-determined bend radius, the retaining wall having an inside face, and a retaining tine connected to the retaining wall inside face. The hinged fiber optic routing guide may also comprise, a retaining clip connected to the base front surface, a tine structural support connected to the retaining tine, a curved portion connected to the base side edge, the curved portion having a pre-determined curvature, a retaining wall structural support connected to the retaining wall, a plurality of oppositely facing curved retaining clips. Wherein the retaining wall is orthogonal to the base front surface, the retaining tine is orthogonal to the retaining wall inside face, the base having a side edge, the base is comprised of plastic and the base is substantially plate shaped.

DETAILED DESCRIPTION OF THE INVENTION

Figure 1:
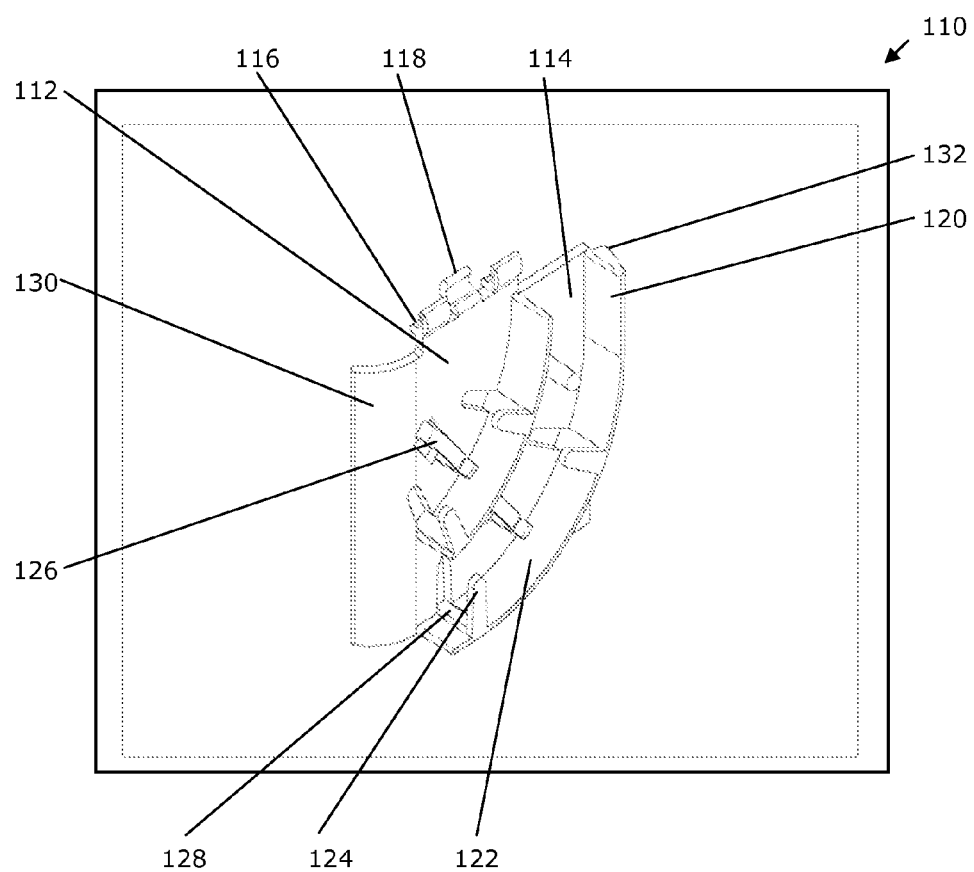
FIG. 1 illustrates a hinged fiber optic routing guide that includes an embodiment of the present invention as a portion thereof.

Referring now to FIG. 1, a hinged fiber optic routing guide 110 is depicted. A hinged fiber optic routing guide comprises, a base 112 having a front surface 114 and a top edge 116, a hinge 118 connected to the base top edge and a retaining wall 120 connected to the base front surface. The hinged fiber optic routing guide retaining wall has a pre-determined bend radius, the retaining wall has an inside face 122, and a retaining tine 124 is connected to the retaining wall inside face. The hinged fiber optic routing guide may also comprise, a retaining clip 126 connected to the base front surface, a tine structural support 128 connected to the retaining tine and a curved portion 130 connected to the base side edge. The hinged fiber optic routing guide curved portion has a pre-determined curvature. The hinged fiber optic routing guide may have a retaining wall structural support 132 connected to the retaining wall. Wherein the curved retaining clips are oppositely facing. Wherein the retaining wall is orthogonal to the base front surface, the retaining tine is orthogonal to the retaining wall inside face, the base has a side edge, the base is comprised of plastic and the base is substantially plate shaped.

Figure 2:
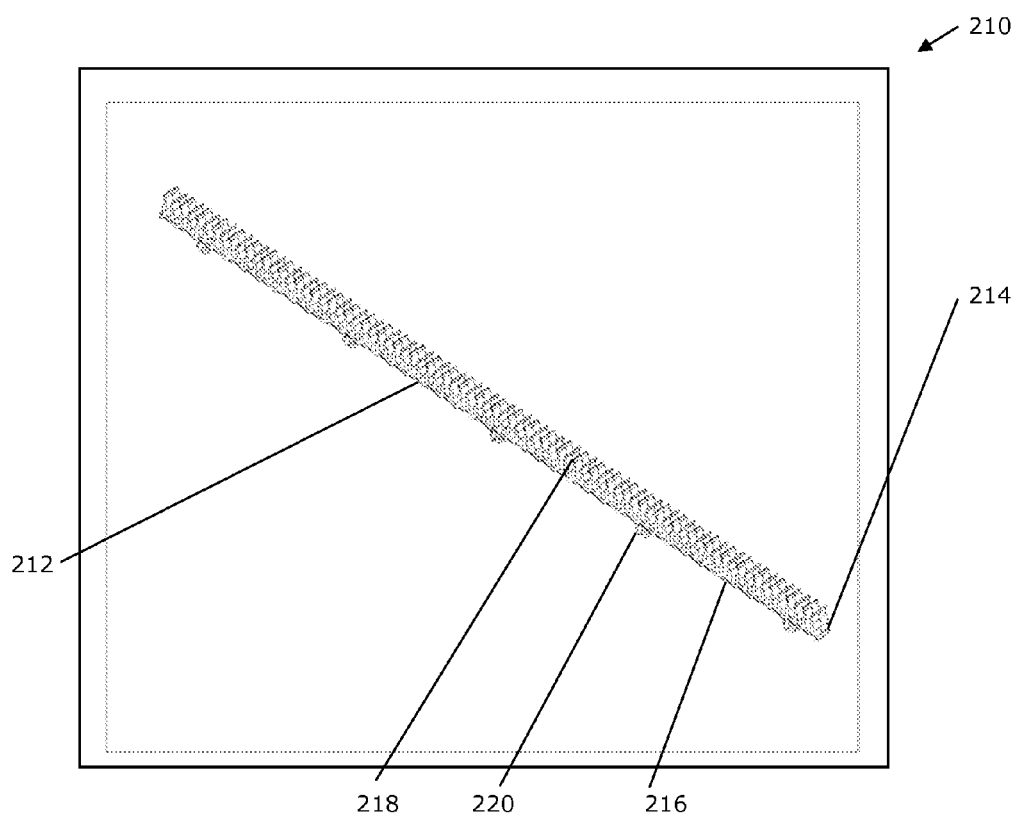
FIG. 2 illustrates a fiber optic cable retention guide.

Referring now to FIG. 2, a fiber optic cable retention guide 210 is depicted. A fiber optic retention guide comprises a longitudinal base 212 having a top side 214 and a bottom side 216, and a plurality of tines 218. The fiber optic cable retention guide has a bracket 220 that connects to the longitudinal base for securing the base.

Figure 3:
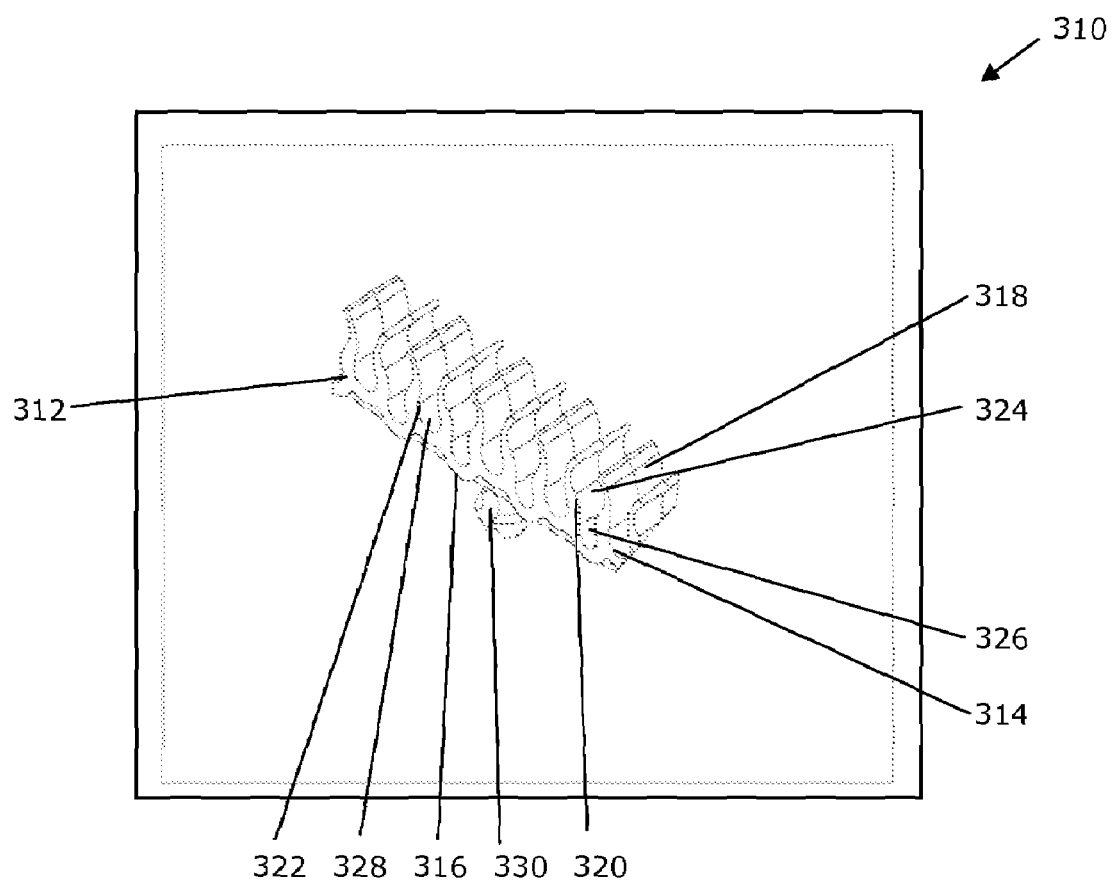
FIG. 3 illustrates a fiber optic cable retention guide.

Referring now to FIG. 3, a fiber optic cable retention guide 310 is depicted. A fiber optic retention guide comprises a longitudinal base 312 having a top side 314 and a bottom side 316, and a plurality of tines 318 having a dual channel side 320, the plurality of tines having a single channel side 322. The fiber optic cable retention guide tine dual channel side has a first pocket 324 for retaining a first diameter fiber optic cable, the dual channel side has a second pocket 326 for retaining a second diameter fiber optic cable. The first pocket is in communication with the second pocket. The fiber optic cable retention guide tine single channel side has a third pocket 328 for retaining a third diameter fiber optic cable. The fiber optic cable retention guide tine dual channel sides face dual channel sides and the tine single channel sides face single channel sides. The fiber optic cable retention guide has a bracket 330 that connects to the longitudinal base for securing the base. The fiber optic cable retention guide can also be comprised of plastic and may be flexible.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. Although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient.

What is claimed is:

1. A hinged fiber optic routing guide, comprising:
   a base having a front surface and a top edge;
   a hinge connected to the base top edge;
   a first retaining wall connected to the base front surface, and a second retaining wall connected to a mid portion of the base, the retaining walls having a similar pre-determined bend radius, the retaining walls having an inside face; and
   a plurality of retaining tines connected to the retaining walls' inside faces;
   wherein the second retaining wall is shorter than the first retaining wall.

2. The hinged fiber optic routing guide of claim 1 wherein the retaining wall is orthogonal to the base front surface.

3. The hinged fiber optic routing guide of claim 1 wherein the retaining tine is orthogonal to the retaining wall inside face.

4. The hinged fiber optic routing guide of claim 1 comprising:
   a retaining clip connected to the base front surface.

5. The hinged fiber optic routing guide of claim 1 comprising:
   a tine structural support connected to the retaining tine.

6. The hinged fiber optic routing guide of claim 1 comprising:
   wherein the base having a side edge; and
      a curved portion connected to the base side edge, the curved portion having a pre-determined curvature.

7. The hinged fiber optic routing guide of claim 1 wherein the base is comprised of plastic.

8. The hinged fiber optic routing guide of claim 1 comprising:
   a retaining wall structural support connected to the retaining wall.

9. The hinged fiber optic routing guide of claim 1 wherein the base is substantially plate shaped.

10. The hinged fiber optic routing guide of claim 1 wherein the hinge is comprised of a plurality of oppositely facing curved retaining clips.

11. A hinged fiber optic routing guide, comprising:
    a base having a front surface and a top edge and a side edge;
    a hinge connected to the base top edge;
    a first retaining wall connected to the base front surface, and a second retaining wall connected to a mid portion of the base, the retaining walls having a similar pre-determined bend radius, the retaining walls having an inside face; and
    a curved portion connected to the base side edge, the curved portion having a pre-determined curvature.

12. The hinged fiber optic routing guide of claim 11 comprising:
    a retaining tine connected to the retaining wall inside face.

13. The hinged fiber optic routing guide of claim 12 comprising:
    a tine structural support connected to the retaining tine.

14. The hinged fiber optic routing guide of claim 11 comprising:
    a retaining wall structural support connected to the retaining wall.

15. The hinged fiber optic routing guide of claim 11 comprising:
    a retaining clip connected to the base front surface.

16. The hinged fiber optic routing guide of claim 11 wherein the retaining wall is orthogonal to the base front surface.

17. A hinged fiber optic routing guide, comprising:
    a base having a front surface and a top edge and a side edge;
    a hinge connected to the base top edge;
    a first retaining wall connected to the base front surface, and a second retaining wall connected to a mid portion of the base, the retaining walls having a similar pre-determined bend radius, the retaining walls having an inside face;
    a plurality of retaining tines connected to the retaining walls' inside faces;
    a retaining clip connected to the base front surface; and
    a curved portion connected to the base side edge, the curved portion having a pre-determined curvature.

18. The hinged fiber optic routing guide of claim 17 comprising:
    a tine structural support connected to the retaining tine.

19. The hinged fiber optic routing guide of claim 17 comprising:
    a retaining wall structural support connected to the retaining wall.

20. The hinged fiber optic routing guide of claim 17 wherein the base is substantially plate shaped.

* * * * *